United States Patent
Liang et al.

(10) Patent No.: US 11,068,106 B2
(45) Date of Patent: Jul. 20, 2021

(54) NOISE SENSING CIRCUIT AND TOUCH DEVICE

(71) Applicant: SHENZHEN GOODIX TECHNOLOGY CO., LTD., Guangdong (CN)

(72) Inventors: Yingsi Liang, Guangdong (CN); Ya-Nan Wen, Taipei (TW)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/130,888

(22) Filed: Sep. 13, 2018

(65) Prior Publication Data

US 2019/0012034 A1    Jan. 10, 2019

Related U.S. Application Data

(63) Continuation of application No. PCT/CN2016/111594, filed on Dec. 22, 2016.

(51) Int. Cl.
G06F 3/044 (2006.01)
G06F 3/041 (2006.01)

(52) U.S. Cl.
CPC ............ *G06F 3/0418* (2013.01); *G06F 3/044* (2013.01); *G06F 3/0412* (2013.01)

(58) Field of Classification Search
CPC ....... G06F 3/0412; G06F 3/0418; G06F 3/044
See application file for complete search history.

(56) References Cited

U.S. PATENT DOCUMENTS 5,956,415 A * 9/1999 McCalley ............ G06K 9/0002
382/124
2011/0163983 A1* 7/2011 Maki ................... G06F 3/04166
345/173

(Continued)

FOREIGN PATENT DOCUMENTS

CN    101080689 A    11/2007
CN    102725715 A    10/2012
(Continued)

OTHER PUBLICATIONS

Search Report dated Apr. 23, 2019 by the European Patent Office for counterpart application No. 16924221.1.
(Continued)

*Primary Examiner* — Vijay Shankar
*Assistant Examiner* — Cory A Almeida
(74) *Attorney, Agent, or Firm* — WPAT, P.C., Intellectual Property Attorneys; Anthony King (57) ABSTRACT

A noise sensing circuit is provided according to the disclosure. The noise sensing circuit includes a first filter, which is coupled to a plurality of receiving electrodes, and configured for receiving a plurality of reception signals corresponding to the plurality of receiving electrodes, and performing a high pass filtering operation or a band pass filtering operation on the plurality of reception signals to generate a filtering result; a down-sampling unit, which is coupled to the first filter, and configured for performing a down-sampling operation on the filtering result to generate a down-sampling result; and a noise detection unit, which is coupled to the down-sampling unit, and configured for determining a first operating frequency of the touch device according to the down-sampling result.

18 Claims, 9 Drawing Sheets

(56) References Cited

U.S. PATENT DOCUMENTS

| | | | | |
|---|---|---|---|---|
| 2012/0200524 A1* | 8/2012 | Vallis | ............... | G06F 3/044 |
| | | | | 345/174 |
| 2014/0022203 A1* | 1/2014 | Karpin | ............... | G06F 19/00 |
| | | | | 345/174 |
| 2014/0049266 A1 | 2/2014 | Heim et al. | | |
| 2015/0234519 A1* | 8/2015 | Gowreesunker | ...... | G06F 3/0418 |
| | | | | 345/174 |
| 2015/0303936 A1* | 10/2015 | Rao | ............... | G06F 3/04842 |
| | | | | 715/840 |
| 2016/0117034 A1* | 4/2016 | Day | ............... | G06F 3/0416 |
| | | | | 345/174 |
| 2016/0266687 A1* | 9/2016 | Kim | ............... | G06F 3/0418 |

FOREIGN PATENT DOCUMENTS

| | | |
|---|---|---|
| CN | 103902133 A | 7/2014 |
| CN | 104662393 A | 5/2015 |
| CN | 105144048 A | 12/2015 |
| CN | 105144048 A | 12/2015 |
| CN | 105980960 A | 9/2016 |
| CN | 105980960 A | 9/2016 |

OTHER PUBLICATIONS

English abstract translation of CN105980960A.
English abstract translation of CN105144048A.
English abstract translation of CN101080689A.
English abstract translation of CN102725715A.
English abstract translation of CN104662393A.
English International Search Report of PCT/CN2016/111594.
Written Opinion of PCT/CN2016/111594.
International Search Report of PCT/CN2016/111594.
English Abstract of CN103902133A.
English Abstract of CN105144048A.
English Abstract of CN105980960A.

* cited by examiner

NOISE SENSING CIRCUIT AND TOUCH DEVICE

CROSS REFERENCE TO RELATED APPLICATIONS

The present application is a continuation of international application PCT/CN2016/111594, filed on Dec. 22, 2016, which is hereby incorporated by reference in its entirety.

FIELD

The disclosure relates to a noise sensing circuit and a touch device, and in particular to a noise sensing circuit and a touch device that are capable of filtering noises generated by a display screen.

BACKGROUND

With the development of science and technology, the operation interfaces of various electronic products have gradually become humanized in recent years. For example, through a touch panel, the user can directly operate on the screen with a finger or a stylus to input information, words and patterns, thus eliminating the trouble of using an input device such as a keyboard or a key. In fact, the touch screen is usually composed of a sensing panel and a display disposed behind the sensing panel. An electronic device judges the intention of the user's touch on the sensing panel according to the position of the touch on the sensing panel and the picture presented by the display at the same time, and executes a corresponding operation result.

To elaborate, the touch screen is mainly affected by the noise from the display screen and the noise from the charger, wherein the display screen noise affects all the electrodes in the touch screen, and the charger noise affects only some of the electrodes in the touch screen. The noise detection technology that can detect the noise spectrum has been developed in the prior art. However, the energy of the display screen noise is usually greater than that of the charger noise, and the display screen noise and the charger noise cannot be clearly distinguished in the prior art. Hence, the spectrum of the charger noise cannot be effectively detected using the existing noise detection technology, and the charger noise's influence on the overall performance cannot be reduced.

Therefore, there is a need for improvement in the prior art.

SUMMARY

Therefore, a main object of some embodiments of the present disclosure is to provide a noise sensing circuit and a touch device, which are capable of filtering noises generated by a display screen, so as to overcome the drawbacks of the prior art.

In order to resolve the above issues, the present disclosure provides a noise sensing circuit which can be applied to a touch device. The touch device includes a plurality of receiving electrodes and a display screen. The plurality of receiving electrodes are arranged on the display screen. The noise sensing circuit includes a first filter, coupled to the plurality of receiving electrodes, and configured for receiving a plurality of reception signals corresponding to the plurality of receiving electrodes, and performing a high pass filtering operation or a band pass filtering operation on the plurality of reception signals to generate a filtering result; a down-sampling unit, coupled to the first filter, and configured for performing a down-sampling operation on the filtering result to generate a down-sampling result; and a noise detection unit, coupled to the down-sampling unit, and configured for determining a first operating frequency of the touch device according to the down-sampling result. The plurality of reception signals include full-screen noise and contact noise, the full-screen noise interferes with the plurality of receiving electrodes, and the contact noise interferes with only some of the receiving electrodes.

For instance, the noise sensing circuit further includes a parallel-to-serial converter, coupled between the plurality of receiving electrodes and the first filter, and configured for sequentially transmitting the plurality of reception signals to the first filter.

For instance, the noise sensing circuit further includes a front-end circuit, coupled between the plurality of receiving electrodes and the parallel-to-serial converter, and configured for performing front-end signal processing on a plurality of signals of the plurality of receiving electrodes.

For instance, the noise sensing circuit further includes a sample and hold circuit, coupled between the plurality of receiving electrodes and the parallel-to-serial converter, and configured for performing a sample and hold operation on a plurality of signals of the plurality of receiving electrodes at a first time to generate the plurality of reception signals.

For instance, the noise sensing circuit further includes an analog-to-digital converter, coupled between the parallel-to-serial converter and the first filter.

For instance, the noise sensing circuit further includes a shift register, coupled between the parallel-to-serial converter and the first filter.

For instance, the noise sensing circuit further includes a plurality of analog-to-digital converters, coupled to the plurality of receiving electrodes respectively.

For instance, the high pass filtering operation or the band pass filtering operation is used for filtering full-screen noise from the plurality of reception signals to obtain the filtering result, and the full-screen noise is generated by the display screen and/or interferes with all of the plurality of receiving electrodes.

For instance, the first operating frequency is an operating frequency that is least affected by the contact noise, and the contact noise is generated by a charger of the touch device and/or interferes with only some of the receiving electrodes.

For instance, an energy of the contact noise at the first operating frequency is less than a threshold.

The present disclosure further provides a touch device, including a display screen, a plurality of receiving electrodes arranged on the display screen, and a noise sensing circuit. The noise sensing circuit includes a first filter, coupled to the plurality of receiving electrodes, and configured for receiving a plurality of reception signals corresponding to the plurality of receiving electrodes, and performing a high pass filtering operation or a band pass filtering operation on the plurality of reception signals to generate a filtering result; a down-sampling unit, coupled to the first filter, and configured for performing a down-sampling operation on the filtering result to generate a down-sampling result; and a noise detection unit, coupled to the down-sampling unit, and configured for determining a first operating frequency of the touch device according to the down-sampling result. The plurality of reception signals include full-screen noise and contact noise, the full-screen noise interferes with the plurality of receiving electrodes, and the contact noise interferes with only some of the receiving electrodes. The high pass filtering operation or the band pass filtering operation is used for filtering full-screen noise from the plurality of reception signals to obtain the filtering result.

DETAILED DESCRIPTION

In order to make the objects, technical solutions and advantages of the disclosure clearer and more apparent, the disclosure is further described below in detail with reference to the embodiments and the accompanying drawings. It should be noted that the specific embodiments described herein are merely used to explain the disclosure, and are not intended to limit the disclosure.

Figure 1:
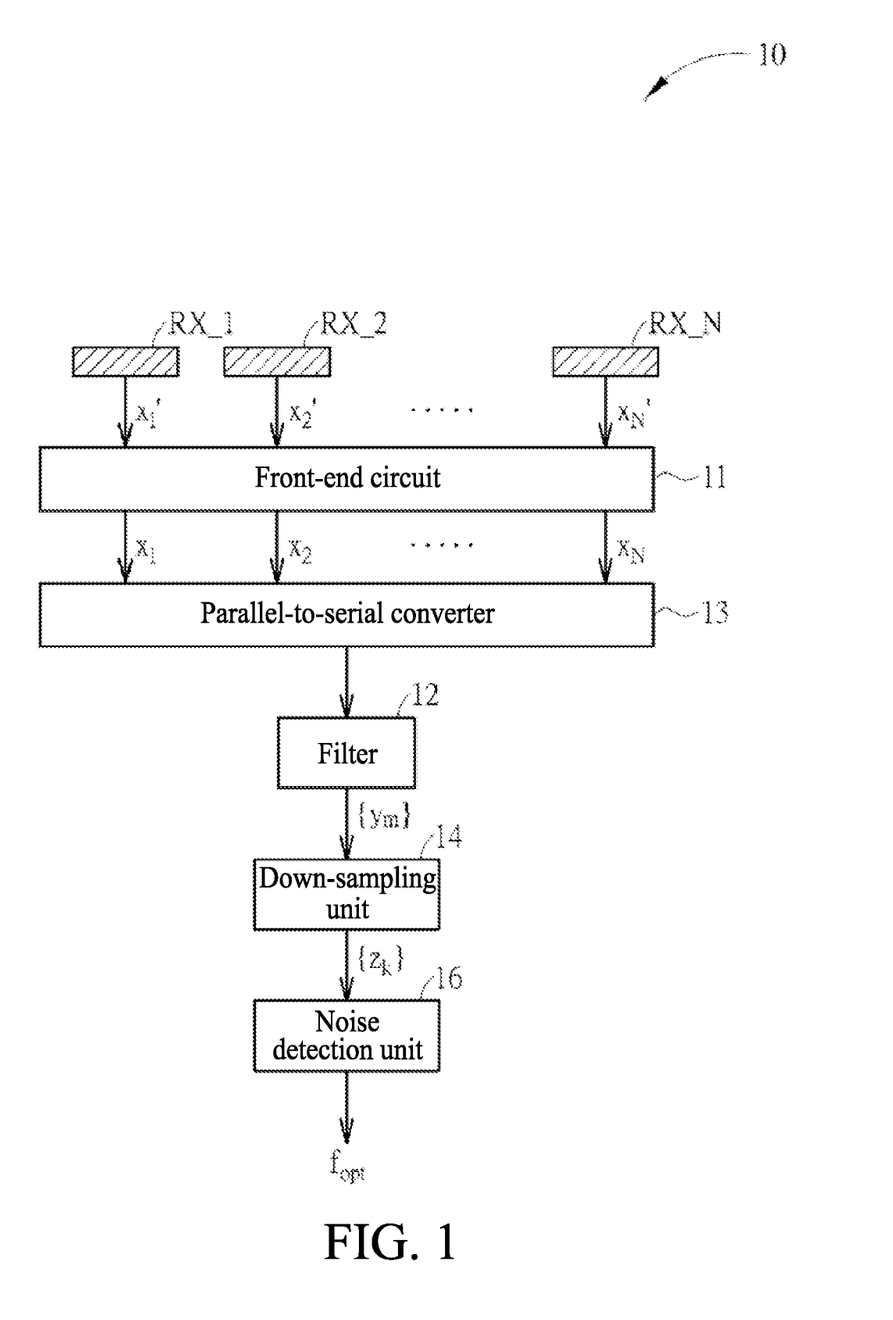
FIG. 1 is a schematic diagram of a noise sensing circuit according to an embodiment of the present disclosure.
Figure 2:
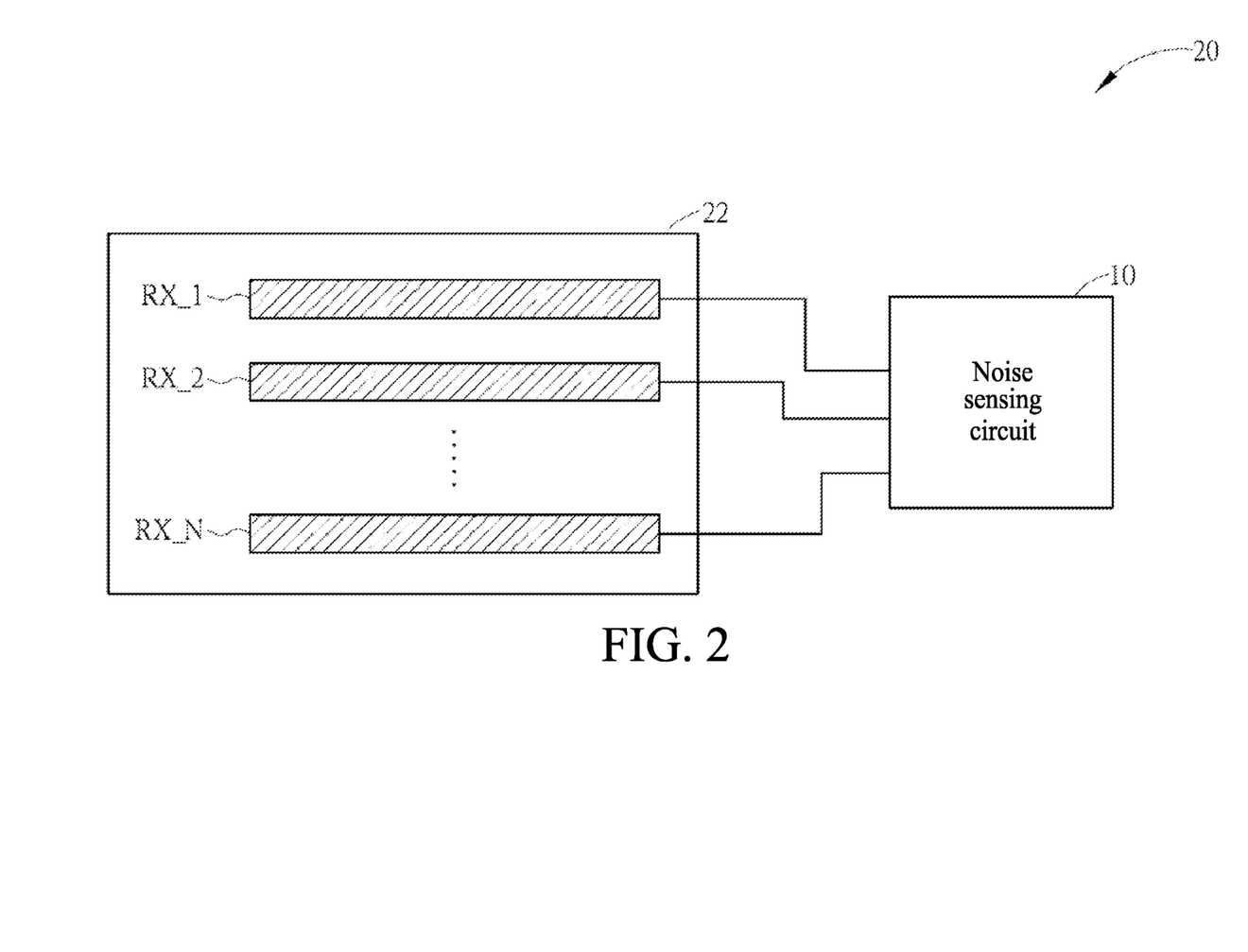
FIG. 2 is a schematic diagram of a touch device according to an embodiment of the present disclosure.

With reference to FIG. 1 and FIG. 2, FIG. 1 is a schematic diagram of a noise sensing circuit 10 according to an embodiment of the present disclosure, and FIG. 2 is a schematic diagram of a touch device 20 according to an embodiment of the present disclosure. The touch device 20 includes a plurality of receiving electrodes RX_1 to RX_N, a display screen 22, and a noise sensing circuit 10. The receiving electrodes RX_1 to RX_N are arranged on or integrated into the display screen 22 and are used for outputting a touch sensing signal according to the touch of an external object. The noise sensing circuit 10 is coupled to the receiving electrodes RX_1 to RX_N. In the noise detection mode of the touch device 20, the noise sensing circuit 10 may filter the noise generated by the display screen 22 and obtain an operating frequency $f_{opt}$ which is least affected by the noise so that the touch device 20 can operate at the operating frequency $f_{opt}$ in a touch identification mode for achieving the best touch identification performance.

To elaborate, as shown in FIG. 1, the noise sensing circuit 10 includes a front-end circuit 11, a parallel-to-serial converter 13, a filter 12, a down-sampling unit 14 and a noise detection unit 16. The front-end circuit 11 is coupled to the receiving electrodes RX_1 to RX_N, and may perform a front-end signal processing on signals $x_1'$ to $x_N'$ received by the receiving electrodes RX_1 to RX_N such as filtering, amplifying and buffering (that is, the front-end circuit 11 may include a front-end signal processing circuit such as a filter, an amplifier and a buffer) to generate reception signals $x_1$ to $x_N$ corresponding to the receiving electrodes RX_1 to RX_N, respectively. The parallel-to-serial converter 13 is coupled between the front-end circuit 11 and the filter 12 to parallelly receive the reception signals $x_1$ to $x_N$ corresponding to the receiving electrodes RX_1 to RX_N, and to sequentially transmit the reception signals $x_1$ to $x_N$ to the filter 12, or to transmit the reception signals $x_1$ to $x_N$ to the filter 12 in serial. The filter 12 is coupled to the parallel-to-serial converter 13, and is used for performing a high pass filtering operation or a band pass filtering operation on the reception signals $x_1$ to $x_N$ to generate a filtering result $\{y_m\}$, wherein m represents a time index, $y_m$ represents a filtering signal output by the filter 12 at a time $t_m$, and the filtering result $\{y_m\}$ represents a set formed by the filtering signals $y_m$ output by the filter 12 at different time points. The down-sampling unit 14 is coupled to the filter 12, and is used for performing a down-sampling operation on the filtering result $\{y_m\}$ to generate a down-sampling result $\{z_k\}$, wherein k is also a time index, $z_k$ represents a down-sampling signal output by the down-sampling unit 14 at a time $T_k$, and the down-sampling result $\{z_k\}$ represents a set formed by the down-sampling signals $z_k$ output by the down-sampling unit 14 at different time points. The noise detection unit 16 is coupled to the down-sampling unit 14, and is used for determining the operating frequency $f_{opt}$ of the touch device 20 according to the down-sampling result $\{z_k\}$.

To elaborate, the receiving electrodes RX_1 to RX_N are affected by a full-screen noise and a contact noise. The full-screen noise interferes with all of the receiving electrodes RX_1 to RX_N, and the full-screen noise may be generated by the display screen 22. The contact noise interferes with only some of the receiving electrodes RX_1 to RX_N, and the contact noise may be generated by a charger of the touch device, that is, the contact noise is the noise introduced due to the difference between the reference ground potential of the human body and the reference ground potential of the touch device, when the user's finger touches some of the receiving electrodes RX_1 to RX_N. If the reception signals $x_1$ to $x_N$ corresponding to the receiving electrodes RX_1 to RX_N are arranged in a time sequence, the energy of the full-screen noise for the reception signals $x_1$ to $x_N$ arranged in a time sequence will exhibit a low frequency distribution, and the energy of the contact noise for the reception signals $x_1$ to $x_N$ arranged in a time sequence will exhibit a high frequency distribution.

In this case, the noise sensing circuit 10 may distinguish the full-screen noise from the contact noise by using the filter 12 in the noise detection mode. That is, the noise sensing circuit 10 may filter the full-screen noise suffered by the receiving electrodes RX_1 to RX_N, and the filtering result {ym} is mainly affected by the contact noise. Further, in the noise detection mode, the noise sensing circuit 10 may, by using the noise detection unit 16, select the operating frequency $f_{opt}$ which is least affected by the contact noise from a plurality of operating frequencies $f_1$ to $f_M$, so that the touch device 20 operates at the operating frequency $f_{opt}$ in the touch identification mode. The touch device 20 operating at the operating frequency $f_{opt}$ in the touch identification mode means that if the touch device 20 applies a transmission signal having the operating frequency $f_{opt}$ to a plurality of transmission electrodes (not shown in FIG. 2) of the touch device 20 in the touch identification mode, a capacitive sensing circuit of the touch device 20 (not shown in FIG. 2) can sense changes in the capacitances of the receiving electrodes RX_1 to RX_N, and then the position where touch occurs is determined. The details of these operations are well known by those skilled in the art, and are not repeated any more herein.

To elaborate, the parallel-to-serial converter 13 sequentially transmitting the reception signals $x_1$ to $x_N$ to the filter 12 means that the parallel-to-serial converter 13 may transmit the reception signal $x_1$ to the filter 12 at a time $t_1$, may transmit the reception signal $x_2$ to the filter 12 at a time $t_2$, by analogy, and may transmit the reception signal $x_N$ to the filter 12 at a time $t_N$. The down-sampling operation performed by the down-sampling unit 14 is to select only one filtering signal from every N filtering signals to obtain a down-sampling output signal. In other words, the down-sampling signal $z_k$ is a filtering signal output by the filter 12 at a time $t_{kN+k0}$, that is, there is a relational expression $z_k = y_{kN+k0}$ between the down-sampling signal $z_k$ and the filtering signals $y_m$, wherein k0 may be a positive integer in a range from 0 to N—1.

Additionally, the parallel-to-serial converter 13 may be considered as converting the reception signals $x_1$ to $x_N$ distributed in a space domain into the reception signals $x_1$ to $x_N$ distributed in a time domain. That is, a reception signal $x_i$, and a reception signal $x_j$ of the reception signals $x_1$ to $x_N$ received by the parallel-to-serial converter 13 correspond to different receiving electrodes RX_i and RX_j in the space respectively (the receiving electrode RX_i and the receiving electrodes RX_j are arranged at different positions in the space), and a reception signal $x_i$ and a reception signal $x_j$ output by the parallel-to-serial converter 13 correspond to different times $t_i$ and $t_j$ respectively. Further, since the full-screen noise interferes with all of the receiving electrodes RX_1 to RX_N and the contact noise interferes with only some of the receiving electrodes RX_1 to RX_N (such as the receiving electrodes RX_h−1, RX_h, RX_h+1 of the receiving electrodes RX_1 to RX_N), the full-screen noise is at a fundamental frequency or a low frequency in a spectrum of time sequence formed by the reception signals $x_1$ to $x_N$, and the contact noise is at a high frequency in the spectrum of time sequence formed by the reception signals $x_1$ to $x_N$. In this case, the filter 12 may has a zero point at the fundamental frequency or low frequency. In this way, the filter 12 may filter the low frequency components of the reception signals $x_1$ to $x_N$, that is, the filter 12 may filter the full-screen noise generated by the display screen 22, and the filtering result {ym} output by the filter 12 is mainly affected by the contact noise. Moreover, the filtering result {ym} may be considered as an overlapping signal component or an aliasing component of the contact noise at the high frequency. The down-sampling unit 14 may be used to allow the aliasing component of the contact noise at the high frequency to be formed in a specific frequency band. The specific frequency band may be in a range from 0 to fS/N (fS represents a frequency at which the parallel-to-serial converter 13 transmits the reception signals $x_1$ to $x_N$ to the filter 12, and N represents the number of the receiving electrodes RX_1 to RX_N). That is, the down-sampling result $\{z_k\}$ is mainly affected by the contact noise.

Figure 3:
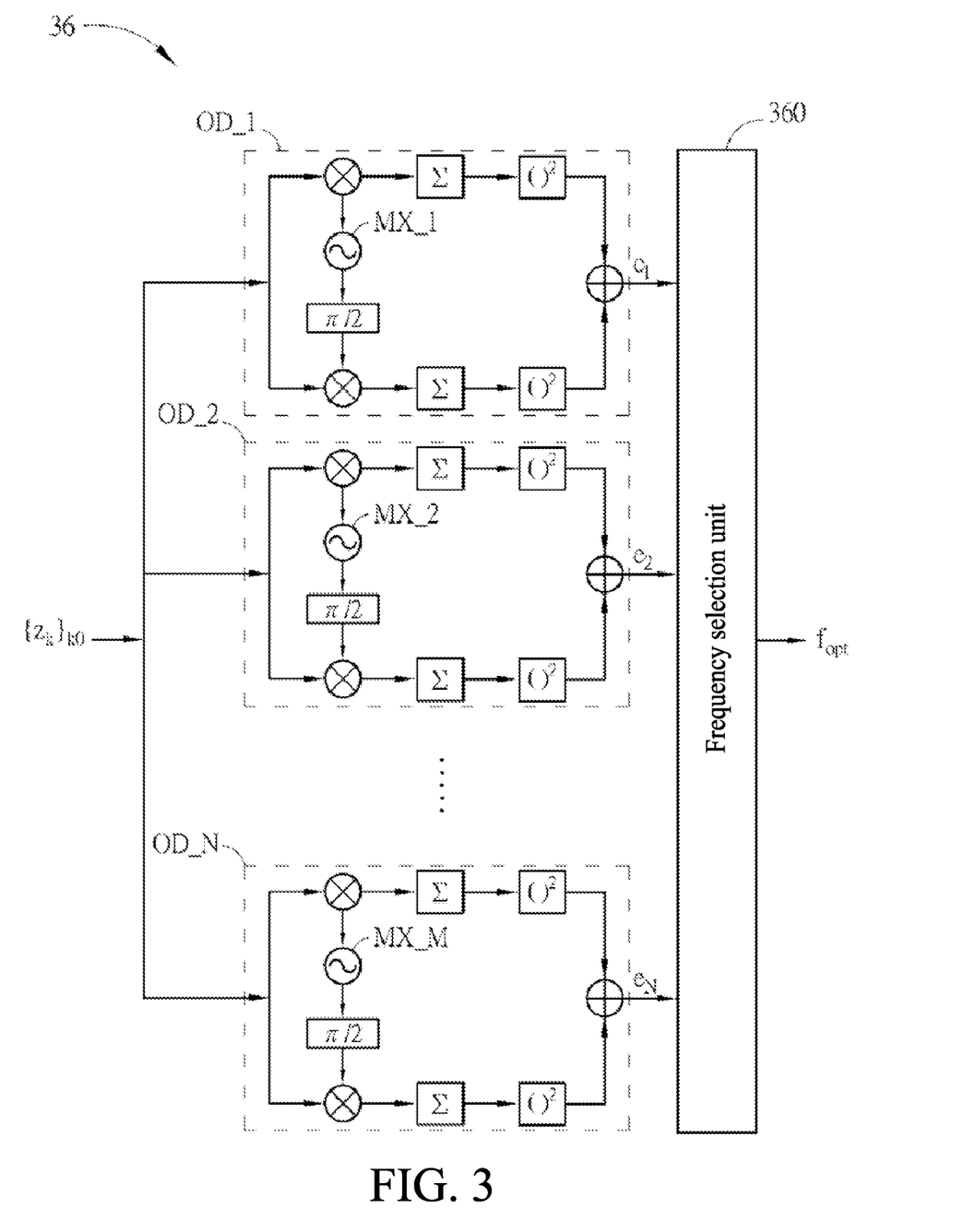
FIG. 3 is a schematic diagram of a noise detection unit according to an embodiment of the present disclosure.
Figure 4:
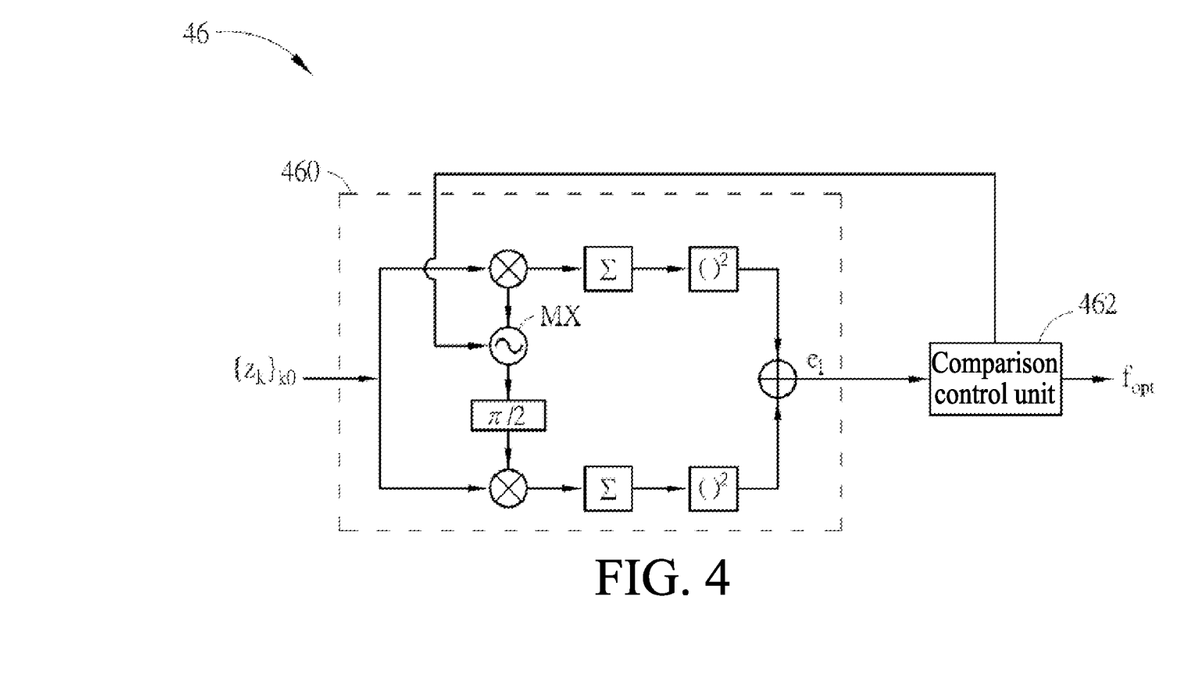
FIG. 4 is a schematic diagram of a noise detection unit according to an embodiment of the present disclosure.

In this way, the noise detection unit 16 may detect noise energy of the down-sampling result $\{z_k\}$/the contact noise at operating frequencies $f_1$ to $f_M$, and select the operating frequency $f_{opt}$ which is least affected by the contact noise from a plurality of operating frequencies $f_1$ to $f_M$. Reference is made to FIG. 3 and FIG. 4, which are schematic diagrams of a noise detection unit 36 and a noise detection unit 46 according to different embodiments of the present disclosure, respectively. The noise detection unit 36 and the noise detection unit 46 may be used to implement the noise detection unit 16. The noise detection unit 36 and the noise detection unit 46 each receives a down-sampling result $\{z_k\}_{k0}$. There is a relational expression $z_k = y_{kN+k0}$ between each down-sampling signal $z_k$ of the down-sampling result $\{z_k\}_{k0}$ and the filtering signals $y_m$, and the down-sampling result $\{z_k\}_{k0}$ may correspond to the reception signal of the receiving electrode RX_k0+1. In other words, the noise detection unit 36 may be considered as parallelly detecting the energy of the contact noise at the operating frequencies $f_1$ to $f_M$ for the receiving electrode RX_k0+1, whereas the noise detection unit 46 may be considered as sequentially detecting the energy of the contact noise at the operating frequencies $f_1$ to $f_M$ for the receiving electrode RX_k0+1.

As shown in FIG. 3, the noise detection unit 36 includes orthogonal demodulation units OD_1 to OD_M and a frequency selection unit 360. The orthogonal demodulation units OD_1 to OD_M include mixers MX_1 to MX-M, respectively. The mixers MX_1 to MX-M are used for mixing the down-sampling result $\{z_k\}_{k0}$ with signals having the frequencies $f_1$ to $f_M$ for the orthogonal demodulation. In this way, the orthogonal demodulation units OD_1 to OD_M may generate noise energies $e_1$ to $e_M$, and the frequency selection unit 360 may select an operating frequency $f_{opt}$ according to the noise energies $e_1$ to $e_M$, wherein the noise energies $e_1$ to $e_M$/the energy of the contact noise at the operating frequency $f_{opt}$ is the minimum. The details of the operations of the orthogonal demodulation units OD_1 to OD_M are well known to those skilled in the art, and will therefore not be repeated herein.

In addition, as shown in FIG. 4, the noise detection unit 46 includes an orthogonal demodulation unit 460 and a comparison control unit 462. The orthogonal demodulation unit 460 includes a mixer MX. The mixer MX may be used for mixing the down-sampling result $\{z_k\}_{k0}$ with a signal having a frequency $f_m$ so that the orthogonal demodulation unit 460 may perform orthogonal demodulation to generate the noise energy $e_m$. The comparison control unit 462 may judge whether the noise energy $e_m$ is greater than a threshold Th. If the noise energy $e_m$ is greater than the threshold Th, the comparison control unit 462 controls the mixer MX so that the mixer MX mixes the down-sampling result $\{z_k\}_{k0}$ with a signal having a frequency $f_{m+1}$ at the next time. If the noise energy $e_m$ is less than the threshold Th, the operating frequency $f_{opt}$ output by the comparison control unit 462 is the frequency $f_m$.

In brief, the noise sensing circuit 10 may filter the full-screen noise suffered by the receiving electrodes RX_1 to RX_N using the filter 12, and may select the operating frequency $f_{opt}$ which is least affected by the contact noise from the plurality of operating frequencies $f_1$ to $f_M$ using the noise detection unit 16, so that the touch device 20 operates at the operating frequency $f_{opt}$ in the touch identification mode to achieve the best touch identification performance.

Figure 5:
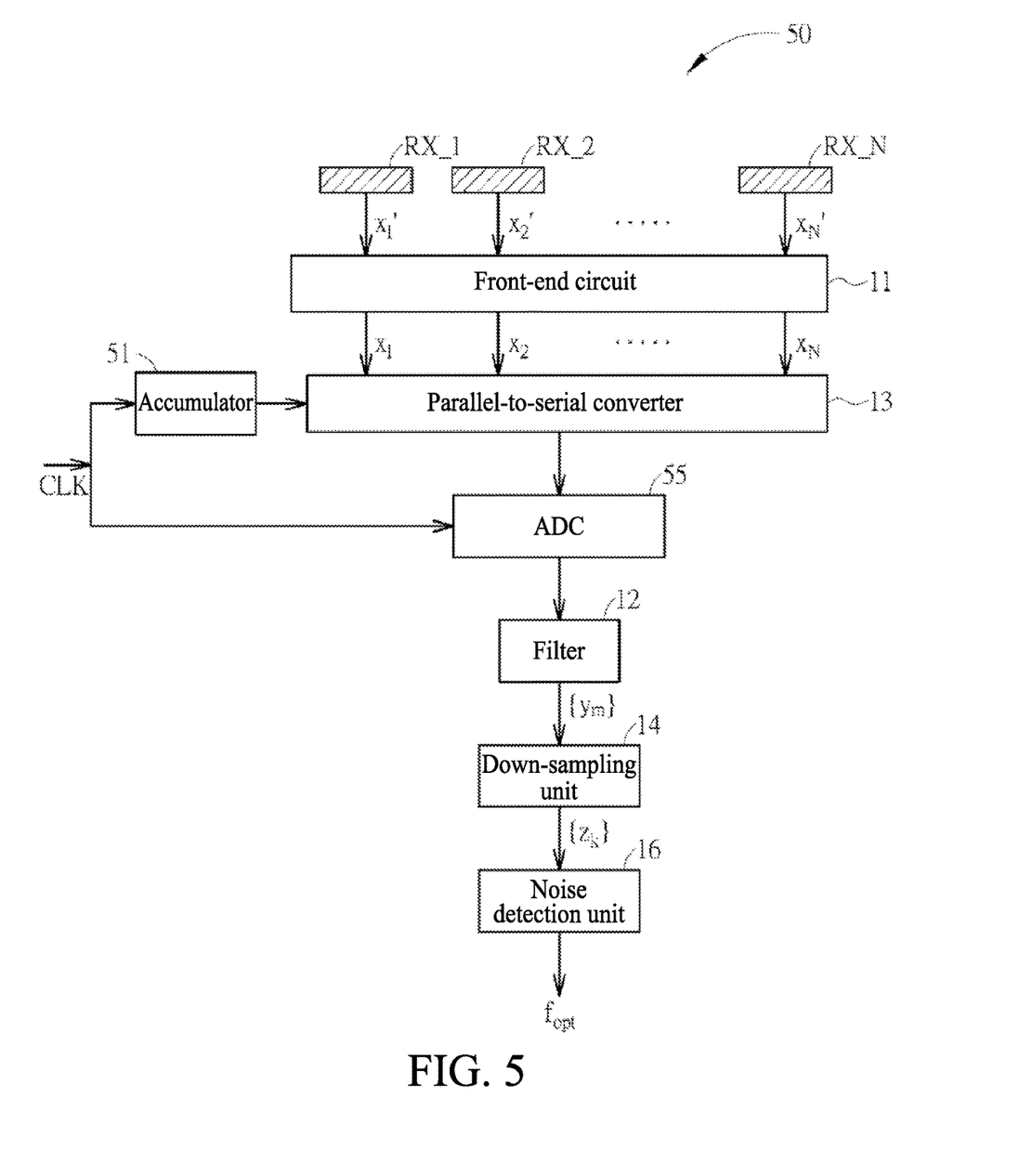
FIG. 5 is a schematic diagram of a noise sensing circuit according to an embodiment of the present disclosure.
Figure 6:
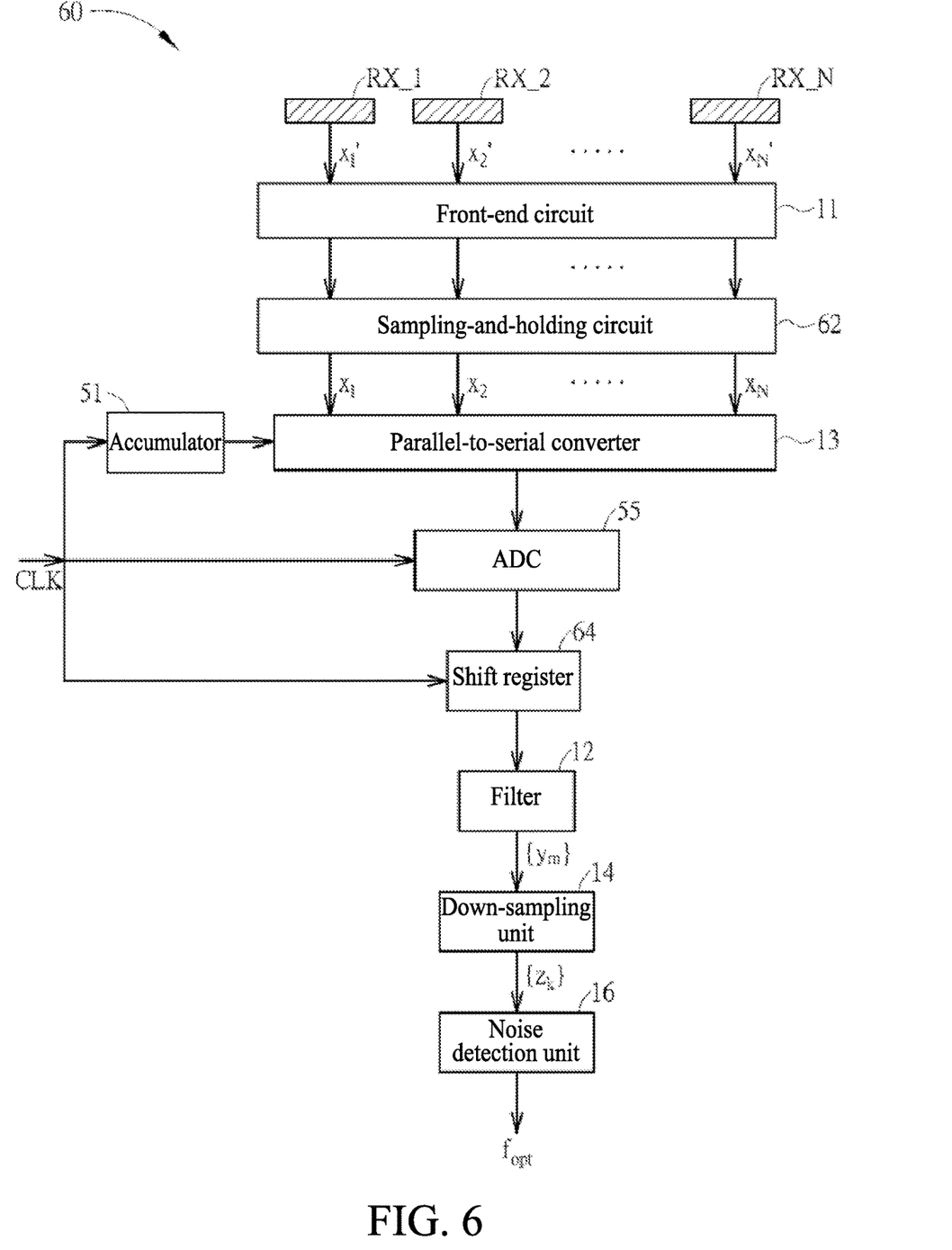
FIG. 6 is a schematic diagram of a noise sensing circuit according to an embodiment of the present disclosure.

It should be noted that the foregoing embodiments are used to explain the concept of the present disclosure, and various modifications based on the foregoing embodiments can be made by those skilled in the art without being limited thereto. Reference is made to FIG. 5 and FIG. 6, which are schematic diagrams of a noise sensing circuit 50 and a noise sensing circuit 60 according to two embodiments of the present disclosure, respectively. The noise sensing circuit 50 is similar to the noise sensing circuit 10, and thus identical parts are denoted by identical reference signs. Unlike the noise sensing circuit 10, the noise sensing circuit 50 further includes an analog-to-digital converter (ADC) 55 and an accumulator 51. The ADC 55 is coupled between the parallel-to-serial converter 13 and the filter 12, and used for converting the reception signals $x_1$ to $x_N$ into digital signals for the filter 12 to perform signal processing. The parallel-to-serial converter 13 and the ADC 55 can be controlled by a frequency signal CLK. In a frequency period $T_n$ of the frequency signal CLK, the parallel-to-serial converter 13 outputs a reception signal $x_n$ to the ADC 55, and the number stored in the accumulator 51 is added by 1. In the next frequency period $T_{n+1}$ of the frequency signal CLK, the parallel-to-serial converter 13 outputs a reception signal $x_{n+1}$ to the ADC 55. In addition, the sampling frequency of the ADC 55 may be a frequency $f_s$, and the frequency $f_s$ is dependent on a reciprocal of the frequency period of the frequency signal CLK. Moreover, the filter in the front-end circuit 11 may be used to prevent the output of the ADC 55 from containing no overlapping signal component.

In addition, the noise sensing circuit 60 is similar to the noise sensing circuit 50, and thus identical parts are denoted by identical reference signs. Unlike the noise sensing circuit 50, the noise sensing circuit 60 further includes a sample and hold (S/H) circuit 62 and a shift register 64. The sample and hold circuit 62 is coupled between the front-end circuit 11 and the parallel-to-serial converter 13 (that is, coupled between the receiving electrodes RX_1 to RX_N and the parallel-to-serial converter 13), and is used for performing a sample and hold operation on the signals $x_1'$ to $x_N'$ received by the receiving electrodes RX_1 to RX_N at a first time so as to generate the reception signals $x_1$ to $x_N$. It should be noted that since the signals $x_1'$ to $x_N'$ received by the receiving electrodes RX_1 to RX_N are sampled by the sample and hold circuit 62 at the same time, the components of the full-screen noise in the reception signals $x_1$ to $x_N$ are the same, that is, the full-screen noise in the reception signals $x_1$ to $x_N$ is a direct current (DC) component, and the filter 12 can have a zero point at the direct current (f=0) in the spectrum. In this way, the filter 12 may filter the DC component from the reception signals $x_1$ to $x_N$, that is, the filter 12 may filter the full-screen noise generated by the display screen 2. In addition, the shift register 64 may be used for temporarily storing the sampling result (namely the digitized reception signals $x_1$ to $x_N$) of the reception signals $x_1$ to $x_N$ by the ADC 55 in a single time interval, and the filter 12 performs a filtering operation only on the reception signals $x_1$ to $x_N$ in this time interval. The time interval represents a duration (namely N frequency periods of the frequency signal CLK) from the time when the parallel-to-serial converter 13 outputs the reception signals $x_1$ to the time when the parallel-to-serial converter 13 outputs the reception signals $x_N$.

Figure 7:
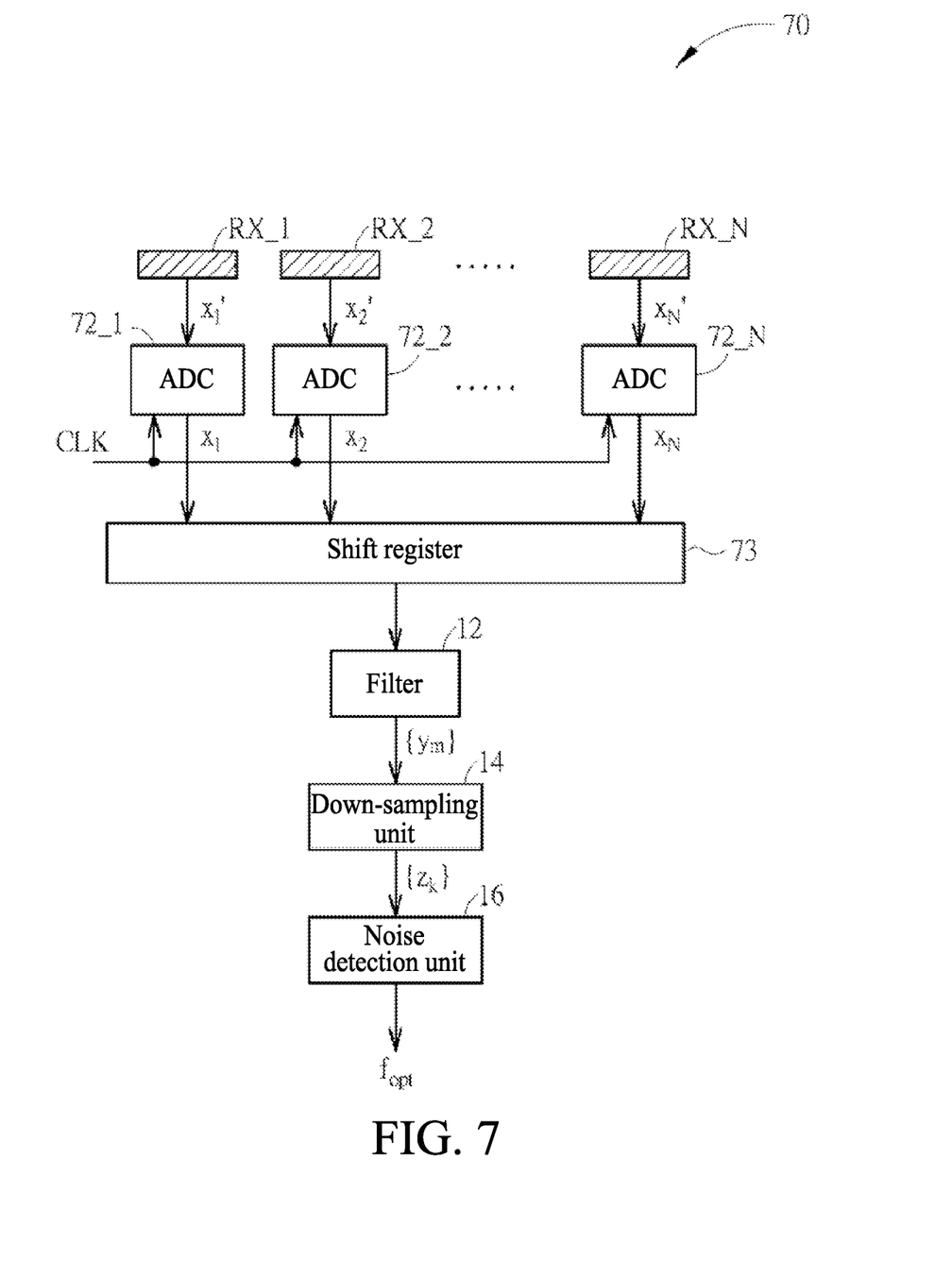
FIG. 7 is a schematic diagram of a noise sensing circuit according to an embodiment of the present disclosure.

In addition, the parallel-to-serial converter of the present disclosure is not limited to being implemented with a multiplexer, and may be implemented using a shift register. Reference is made to FIG. 7, which is a schematic diagram of a noise sensing circuit 70 according to an embodiment of the present disclosure. The noise sensing circuit 70 is similar to the noise sensing circuit 60, and thus identical parts are denoted by identical reference signs. Unlike the noise sensing circuit 60, the noise sensing circuit 70 includes ADCs 72_1 to 72_N and a shift register 73. The shift register 73 is used for implementing the parallel-to-serial converter, and is coupled between the ADCs 72_1 to 72_N and the filter 12 to temporarily store the reception signals $x_1$ to $x_N$ output by the ADCs 72_1 to 72_N in a single time interval. Moreover, the ADCs 72_1 to 72_N are coupled to the receiving electrodes RX_1 to RX_N respectively, and are used for generating (digital) reception signals $x_1$ to $x_N$. Reference may be made to the foregoing embodiments for the details of other operations, which will not be repeated herein.

Figure 8:
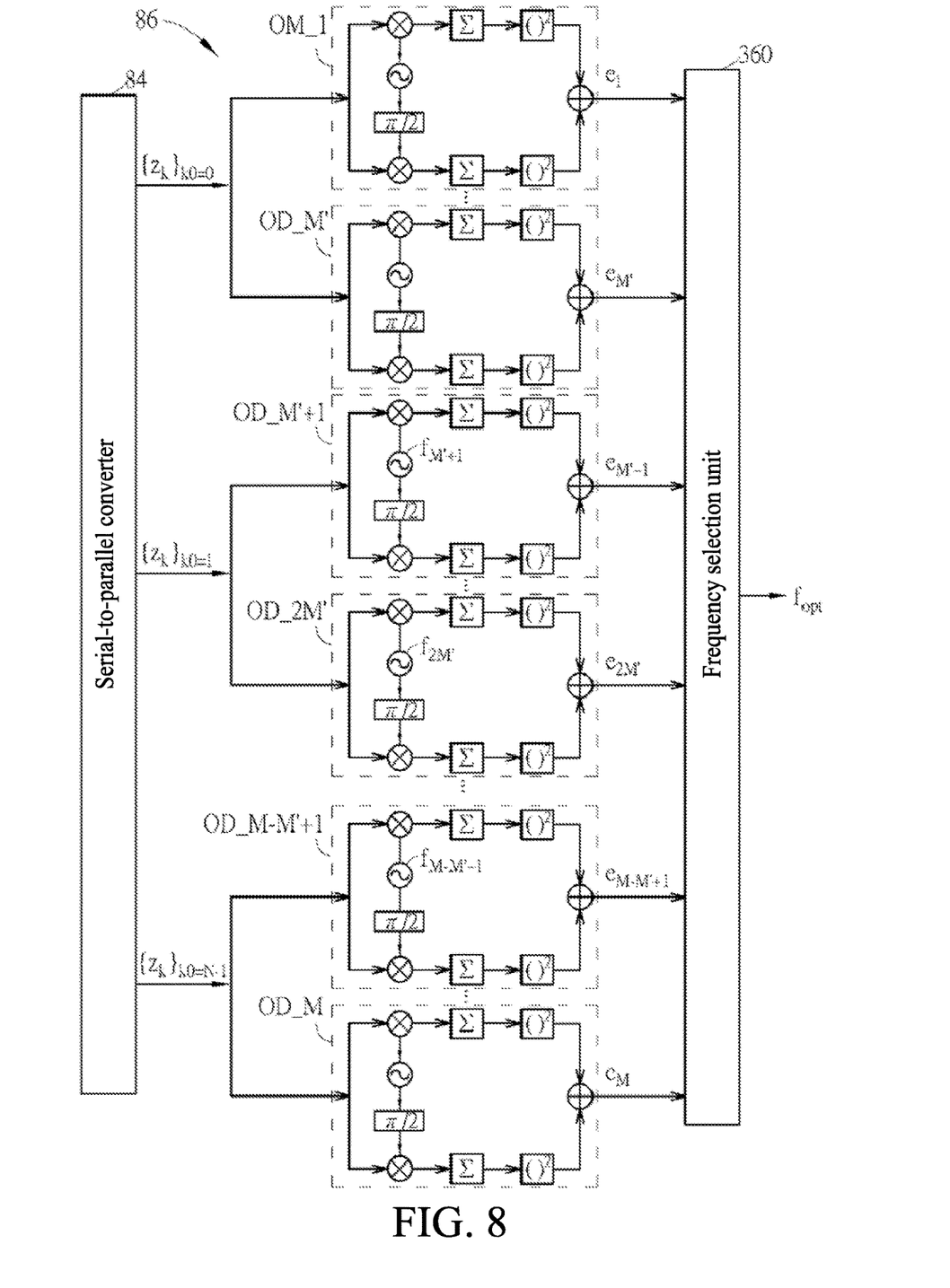
FIG. 8 is a schematic diagram of a noise detection unit according to an embodiment of the present disclosure.

In addition, reference is made to FIG. 8, which is a schematic diagram of a noise detection unit 86 according to an embodiment of the present disclosure. The noise detection unit 86 is coupled to a serial-to-parallel converter 84, and the serial-to-parallel converter 84 may be used for implementing a down-sampling unit. The noise detection unit 86 is similar to the noise detection unit 36, and thus identical parts are denoted by identical reference signs. Unlike the noise detection unit 36, the noise detection unit 86 receives down-sampling results $\{z_k\}_{k0=0}$ to $\{z_k\}_{k0=N-1}$ output by the down-sampling unit 14. There is a relational expression $z_k=y_{kN}$ between each down-sampling signal $z_k$ and the filtering signal $y_m$ in the down-sampling result $\{z_k\}_{k0=0}$, and the down-sampling result $\{z_k\}_{k0=0}$ may correspond to the reception signal of the receiving electrode RX_1. There is a relational expression $z_k=y_{kN+1}$ between each down-sampling signal $z_k$ and the filtering signal $y_m$ in the down-sampling result $\{z_k\}_{k0=1}$, and the down-sampling result $\{z_k\}_{k0=1}$ may correspond to the reception signal of the receiving electrode RX_2. By analogy, there is a relational expression $z_k=y_{kN+N-1}$ between each down-sampling signal $z_k$ and the filtering signal $y_m$ in the down-sampling result $\{z_k\}_{k0=N-1}$, and the down-sampling result $\{z_k\}_{k0=N-1}$ may correspond to the reception signal of the receiving electrode RX_N. In addition, the orthogonal demodulation units OD_1 to OD_M' receive the down-sampling result $\{z_k\}_{k0=0}$ and are used for performing orthogonal demodulation on the down-sampling result $\{z_k\}_{k0=0}$ to generate noise energies $e_1$ to $e_{M'}$ corresponding to frequencies $f_1$ to $f_{M'}$. The orthogonal demodulation units OD_M'+1 to OD_2M' receive the down-sampling result $\{z_k\}_{k0=1}$ and are used for performing orthogonal demodulation on the down-sampling result $\{z_k\}_{k0=1}$ to generate noise energies $e_{M'+1}$ to $e_{2M'}$ corresponding to frequencies $f_{M'+1}$ to $f_{2M'}$. By analogy, the orthogonal demodulation units OD_M−M'+1 to OD_M receive the down-sampling result $\{z_k\}_{k0=N-1}$ and are used for performing orthogonal demodulation on the down-sampling result $\{z_k\}_{k0=N-1}$ to generate noise energies $e_{M-M'+1}$ to $e_M$ corresponding to frequencies $f_{M-M'+1}$ to $f_M$. In brief, in the noise detection unit 36, the orthogonal demodulation units OD_1 to OD_M perform orthogonal demodulation only on the down-sampling result $\{z_k\}_{k0}$ corresponding to the receiving electrode RX_k0+1, whereas in the noise detection unit 86, the orthogonal demodulation units OD_1 to OD_M can perform orthogonal demodulation on the down-sampling result $\{z_k\}_{k0=0}$ to the down-sampling result $\{z_k\}_{k0=N-1}$ corresponding to the receiving electrodes RX_1 to RX_N.

Figure 9:
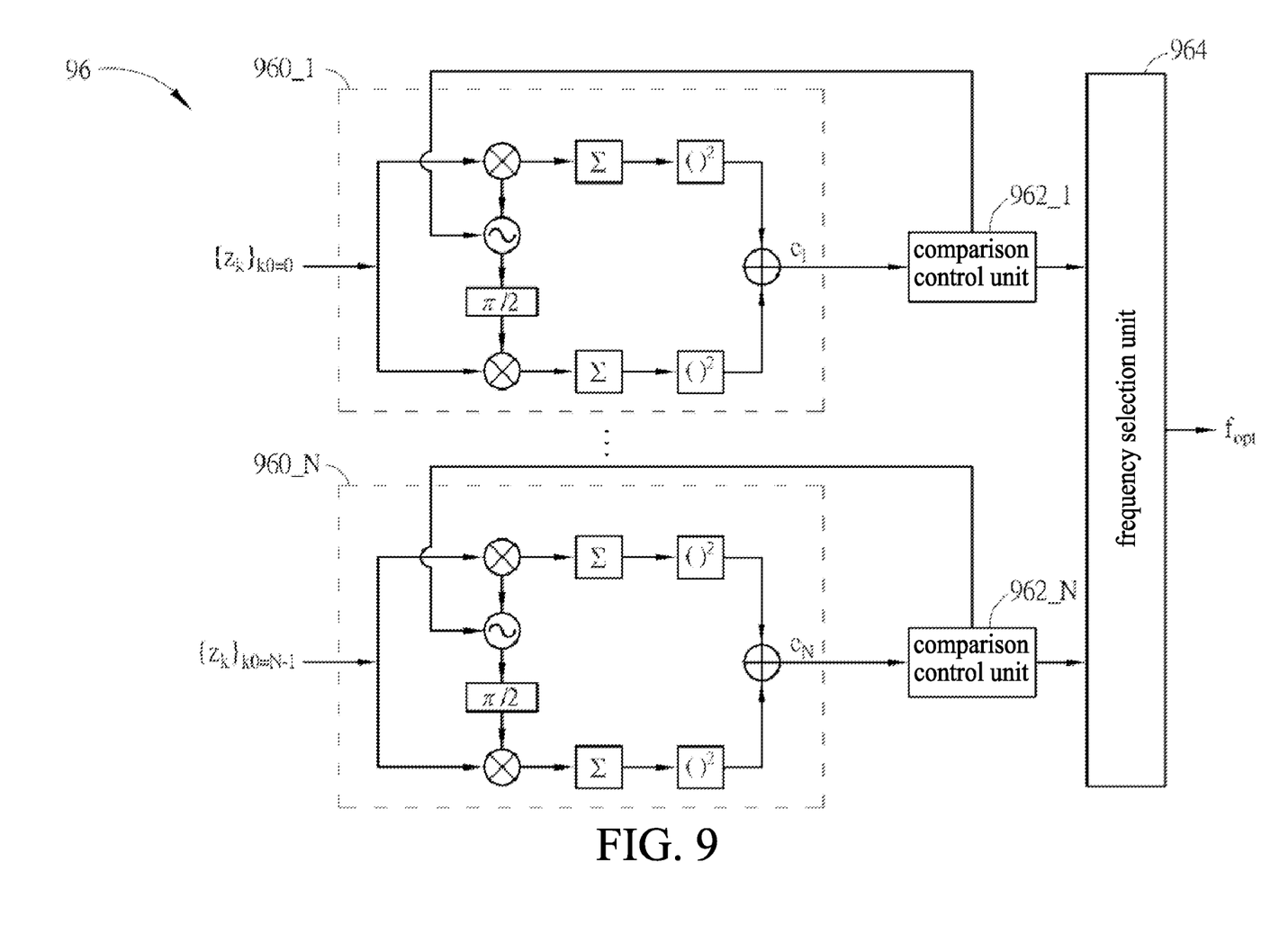
FIG. 9 is a schematic diagram of a noise detection unit according to an embodiment of the present disclosure.

In addition, reference is made to FIG. 9, which is a schematic diagram of a noise detection unit 96 according to an embodiment of the present disclosure. The noise detection unit 96 includes orthogonal demodulation units 960_1 to 960_N, comparison control units 962_1 to 962_N, and a frequency selection unit 964. The orthogonal demodulation unit 960_1 sequentially performs orthogonal demodulation on the down-sampling result $\{zk\}_{k0=0}$ corresponding to the receiving electrode RX_1. The orthogonal demodulation unit 960_2 sequentially performs orthogonal demodulation on the down-sampling result $\{zk\}_{k0=1}$ corresponding to the receiving electrode RX_2. By analogy, the orthogonal demodulation unit 960_N sequentially performs orthogonal demodulation on the down-sampling result $\{zk\}_{k0=N-1}$ corresponding to the receiving electrode RX_N. Reference may be made to the foregoing embodiments for the details of other operations, which will not be repeated herein.

In summary, according to the present disclosure, the high pass or band pass filter can be used to filter the full-screen noise received by the receiving electrodes, and the noise detection unit is used to select the operating frequency which is least affected by the contact noise from a plurality of operating frequencies, so that the touch device operates at the operating frequency in the touch identification mode, thereby achieving the best touch identification performance.

The above description merely relates to some embodiments of the present disclosure and is not intended to limit the present disclosure. Any change, equivalent substitution, improvements or the like made within the spirit and principles of the present disclosure should be considered as falling within the scope of protection of the present disclosure.

What is claimed is:

1. A noise sensing circuit, applied to a touch device, the touch device comprises a plurality of receiving electrodes and a display screen, the plurality of receiving electrodes are arranged on the display screen, the noise sensing circuit comprises:
    a first filter, coupled to the plurality of receiving electrodes, the first filter is configured for receiving a plurality of reception signals corresponding to the plurality of receiving electrodes, and for performing a high pass filtering operation or a band pass filtering operation on the plurality of reception signals to filter full-screen noise, being at a frequency lower than a frequency of contact noise, and accordingly generate a filtering result, wherein the full-screen noise and the contact noise are included in the plurality of reception signals, the full-screen noise interferes with the plurality of receiving electrodes, and the contact noise interferes with only some of the receiving electrodes;
    a down-sampling unit, coupled to the first filter, the down-sampling unit is configured for performing a down-sampling operation on the filtering result to generate a down-sampling result, wherein the filtering result comprises a plurality of filtering signals outputted from the first filter in sequence, the filtering signals correspond to different ones of the plurality of receiving electrodes respectively, and the down-sampling unit is configured to perform the down-sampling operation on the filtering signals by selecting only a portion of the filtering signals from the filtering signals to generate the down-sampling result; and
    a noise detection unit, coupled to the down-sampling unit, the noise detection unit is configured for determining a first operating frequency of a transmission signal applied to a transmission electrode of the touch device according to the down-sampling result;
    wherein the noise detection unit comprises:
    a plurality of orthogonal demodulation units, configured for utilizing a plurality of signals, having a plurality of frequencies respectively, to perform orthogonal demodulation upon the down-sampling result, and accordingly generating a plurality of noise energies corresponding to the frequencies; and
    a frequency selection unit, coupled to the plurality of orthogonal demodulation units, the frequency selection unit is configured for selecting one from among the frequencies corresponding to the plurality of noise energies, as the first operating frequency according to the plurality of noise energies.

2. The noise sensing circuit of claim 1, further comprising a parallel-to-serial converter, coupled between the plurality of receiving electrodes and the first filter, the parallel-to-serial converter is configured for sequentially transmitting the plurality of reception signals to the first filter.

3. The noise sensing circuit of claim 2, further comprising a front-end circuit, coupled between the plurality of receiving electrodes and the parallel-to-serial converter, the front-end circuit is configured for performing front-end signal processing on a plurality of signals of the plurality of receiving electrodes.

4. The noise sensing circuit of claim 2, further comprising a sample and hold circuit, coupled between the plurality of receiving electrodes and the parallel-to-serial converter, the sample and hold circuit is configured for performing a sample and hold operation on a plurality of signals of the plurality of receiving electrodes at a first time to generate the plurality of reception signals.

5. The noise sensing circuit of claim 2, further comprising an analog-to-digital converter, coupled between the parallel-to-serial converter and the first filter.

6. The noise sensing circuit of claim 2, further comprising a shift register, coupled between the parallel-to-serial converter and the first filter.

7. The noise sensing circuit of claim 2, wherein the parallel-to-serial converter is a multiplexer.

8. The noise sensing circuit of claim 2, wherein the parallel-to-serial converter is a shift register.

9. The noise sensing circuit of claim 1, further comprising a plurality of analog-to-digital converters, coupled to the plurality of receiving electrodes respectively and configured to convert the reception signals into digital signals.

10. The noise sensing circuit of claim 1, wherein the high pass filtering operation or the band pass filtering operation is used for filtering full-screen noise from the plurality of reception signals to obtain the filtering result, and the full-screen noise is generated by the display screen and/or interferes with all of the plurality of receiving electrodes.

11. The noise sensing circuit of claim 1, wherein the first operating frequency is an operating frequency that is least affected by the contact noise, and the contact noise is generated by a charger of the touch device and/or interferes with only some of the receiving electrodes.

12. The noise sensing circuit of claim 11, wherein an energy of the contact noise at the first operating frequency is less than a threshold.

13. The noise sensing circuit of claim 1, wherein the down-sampling unit is a series-to-parallel converter.

14. A touch device, comprising:
    a display screen;
    a plurality of receiving electrodes, arranged on or in the display screen and configured for outputting a touch sensing signal according to touch of an external object; and
    a noise sensing circuit, comprising:
        a first filter, coupled to the plurality of receiving electrodes, the first filter is configured for receiving a plurality of reception signals corresponding to the plurality of receiving electrodes, and for performing a high pass filtering operation or a band pass filtering operation on the plurality of reception signals to generate a filtering result, wherein the plurality of reception signals comprise full-screen noise and contact noise, the full-screen noise interferes with the plurality of receiving electrodes, and the contact noise interferes with only part of the receiving electrodes, the high pass filtering operation or the band pass filtering operation is used for filtering the full-screen noise, being at a frequency lower than a frequency of the contact noise, from the plurality of reception signals to obtain the filtering result;
        a down-sampling unit, coupled to the first filter, the down-sampling unit is configured for performing a down-sampling operation on the filtering result to generate a down-sampling result, wherein the filtering result comprises a plurality of filtering signals outputted from the first filter in sequence, the filtering signals correspond to different ones of the plurality of receiving electrodes respectively, and the down-sampling unit is configured to perform the down-sampling operation on the filtering signals by selecting only a portion of the filtering signals from the filtering signals to generate the down-sampling result; and a noise detection unit, coupled to the down-sampling unit, the noise detection unit is configured for determining a first operating frequency of a transmission signal applied to a transmission electrode of the touch device according to the down-sampling result;

wherein the plurality of reception signals comprise full-screen noise and contact noise, the full-screen noise interferes with the plurality of receiving electrodes, and the contact noise interferes with only some of the receiving electrodes.

15. The touch device according to claim 14, further comprising a parallel-to-serial converter, coupled between the plurality of receiving electrodes and the first filter, the parallel-to-serial converter is configured for sequentially transmitting the plurality of reception signals to the first filter.

16. The touch device according to claim 14, wherein the parallel-to-serial converter is a multiplexer or a shift register.

17. The touch device according to claim 14, wherein the noise detection unit comprises:

a plurality of orthogonal demodulation units, configured for utilizing a plurality of signals, having a plurality of frequencies respectively, to perform orthogonal demodulation upon the down-sampling result, and accordingly generating a plurality of noise energies corresponding to the frequencies; and a frequency selection unit, coupled to the plurality of orthogonal demodulation units, the frequency selection unit is configured for selecting one from among the frequencies corresponding to the plurality of noise energies, as the first operating frequency according to the plurality of noise energies; or the noise detection unit comprises:

an orthogonal demodulation unit, configured for generating a first noise energy corresponding to a first frequency, the orthogonal demodulation unit comprises a mixer; and a comparison control unit, coupled to the orthogonal demodulation unit, the comparison control unit is configured for determining whether the first noise energy is greater than a threshold;

wherein when the first noise energy is greater than the threshold, the comparison control unit controls the mixer so that the orthogonal demodulation unit generates a second noise energy corresponding to a second frequency; and when the first noise energy is less than the threshold, the comparison control unit outputs the first operating frequency as the first frequency.

18. The touch device according to claim 14, wherein the down-sampling unit comprises a series-to-parallel converter.

* * * * *